Sept. 15, 1936.  H. W. HOUCK  2,054,421
AMPLIFYING APPARATUS
Filed June 5, 1925
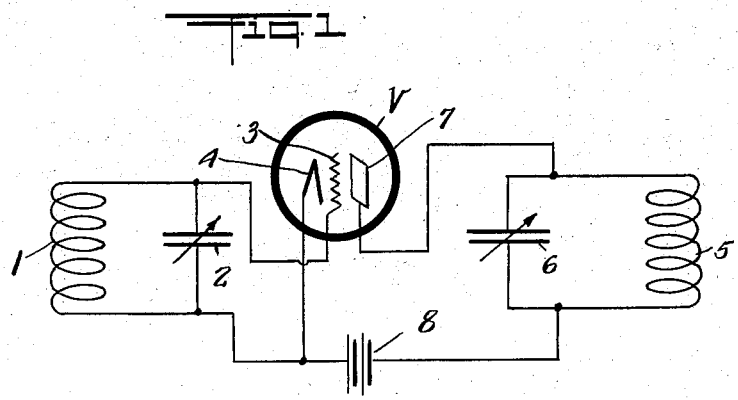
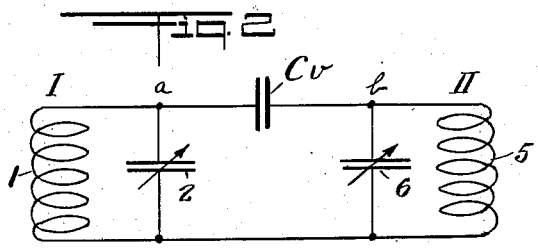
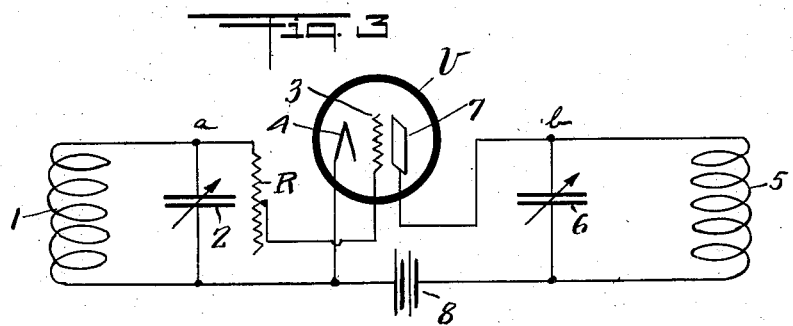
INVENTOR
Harry W. Houck
BY
Van Deventer & Hicker
ATTORNEYS Patented Sept. 15, 1936

2,054,421

UNITED STATES PATENT OFFICE 2,054,421

AMPLIFYING APPARATUS

Harry W. Houck, West Orange, N. J., assignor, by mesne assignments, to Radio Corporation of America, a corporation of Delaware Application June 5, 1925, Serial No. 35,207

6 Claims. (Cl. 179—171)

This invention relates to an improved radio circuit; especially a radio circuit for securing tuned radio frequency amplification, without the disadvantages imposed by the inherent electrostatic capacity of the usual vacuum tube by which amplification of signals is produced.

An object of the herein described invention is the elimination of the disturbing effects in the form of uncontrolled local oscillations due to the electrostatic capacity of a vacuum tube such as is ordinarily employed in wireless circuits and particularly in the type of circuit generally utilized for regenerative amplification in wireless receiving sets.

It is well known to those familiar with the behavior of wireless receiving apparatus, that when radio-frequency amplifiers have both input and output circuits in tune, there exists a pronounced tendency for these circuits to begin to oscillate of their own accord, thereby giving rise to much undesirable noise and rendering intelligible wireless reception impossible. The physical cause of the above mentioned tendency to oscillate is the coupling, electro-magnetic or electrostatic, existing between the tuned circuits of the tube, and while both of these types of coupling can be influenced by well known expedients; for instance, reduced electromagnetically, by so placing the coils as to avoid interaction of their respective magnetic fields, and electrostatically, by interposing properly located metallic shields, the inherent capacity of the vacuum tube will still form a capacity coupling which cannot be obviated by shielding the input and output circuits and which, at high frequencies, is capable of bringing about very undesirable consequences.

My invention aims to provide means whereby oscillations caused by the capacity of the tube are prevented. While the electrostatic capacity of the tube remains, the tuned input and output circuits of the tube are so arranged that oscillations are not allowed to occur in said circuits.

For purposes of explanation, reference is made to the accompanying drawing illustrating an embodiment of my invention, and I, of course, reserve the right to make any changes that are within the principle of the invention, as the same is defined by the broad meanings of the terms of the appended claims.

On said drawing:

Figure 1 represents the usual input and output circuit of an amplifying vacuum tube.

Figure 2 shows a circuit that can be considered as the electrical equivalent of that in Figure 1; and Figure 3 shows a circuit embodying the essential features of my invention.

The same numerals identify the same parts throughout.

An ordinary vacuum valve or audion is indicated at V in Figure 1. It is connected in the usual way to an input circuit comprising a coil 1, and an adjustable condenser 2, united to the grid 3 of the tube. This tube also has a cathode filament 4 and the output circuit includes a coil 5 and variable condenser 6 joined to the plate or anode 7. At 8 is a battery or other source of current. With this apparatus, when both grid and plate circuits are tuned to the same frequency, oscillations between the two circuits at once take place. In the equivalent circuit of Figure 2, I is to be considered as equivalent to the tuned grid or input circuit of Figure 1, and II the equivalent of the tuned plate or output circuit. $Cv$ represents the coupling capacity between the two circuits due to the inherent capacity of the vacuum tube in Figure 1, this inherent capacity generating the oscillations above mentioned. In the circuits widely used at present the constants of the circuits are such, and the capacity current of the tube is so large that the oscillations occur with very great readiness. At the higher frequencies, the capacity current, or current due to the capacity of the tube, fed back into the grid circuit from the plate circuit is increased and the tendency for the oscillations to occur becomes more marked. Generally speaking, this capacity current becomes greater in proportion to the frequency, and the higher the frequency, the greater the current which is fed back into the grid circuit from the plate circuit of the tube.

To avoid the local oscillations, I employ as set forth in Figure 3, a suitable non-inductive resistance R in the input circuit. This resistance, preferably adjustable, though it may be fixed, is interpolated between the grid 3 and one terminal of the adjustable condenser 2 which is connected across the inductance 1 of the input circuit. With the resistance R thus located in series with the grid 3, the oscillations described above will not appear. The inherent capacity of the tube V still exists, but the resistance R completely destroys the ill effect of same.

The presence of the resistance R does not materially affect the strength of the signals received.

In addition to the reduction in the effect of the vacuum tube capacity produced by the insertion of a resistance R as shown in Figure 3, the feedback or oscillations between the input and output circuits of the tube V are also reduced on account of the losses that this resistance causes. These losses are brought about in at least two ways as follows:

In the vacuum tube V, the capacity Cv can be considered as existing mainly between the grid 3 and plate 7. Further capacity, that may be designated as Cl, exists between the grid 3 and filament 4; and capacity C also exists between the filament 4 and plate 7.

Any resistance R inserted as shown, forms with Cl a shunt across the oscillating input circuit and therefore absorbs energy. It is to be noted that this loss of energy is greatest when the variable condenser 2 has least capacity or when the oscillating input circuit is tuned to high frequencies, or low wave-lengths—those wave-lengths that cause most feed-back trouble. Other losses occur only when feed-back starts in. At just that instant a comparatively large transference of energy takes place between the input and output circuits, but that must take place through the resistance R; and therefore comparatively large losses and consequent damping are introduced. This accounts also for the small effect on signal strength of the resistance R.

Having described my invention, what I believe to be new and desire to secure and protect by Letters Patent of the United States is:—

1. The combination with a thermionic amplifier, of an input system therefor tunable throughout a wave length range by fixed inductance and a variable condenser effectively in shunt therewith, of an output system tunable throughout said wave length range by a fixed inductance with a variable condenser effectively in shunt therewith, said output system having the characteristic that the tendency of the amplifying system to become unstable increases throughout said wave length range as said input and output systems are tuned to shorter and shorter wave lengths of said range, and a fixed resistance disposed electrically in series with the input electrodes of said amplifier and the common terminals of the inductance and tuning condenser of the input system, whereby the aforesaid tendency of the amplifying system to instability is compensated for by said resistance whose stabilizing effect rapidly increases with decrease of wave length.

2. The combination with a thermionic amplifier, of an input system therefor tunable throughout a wave length range by fixed inductance and a variable condenser in shunt therewith forming a tunable loop, an output system tunable throughout said wave length range by fixed inductance and a variable condenser effectively in shunt therewith, the tendency of the amplifying system to become unstable increasing as said input and output systems are tuned to shorter and shorter wave lengths of said range, and an impedance disposed in said input system external to said loop and in series with inter-electrode capacity within said amplifier, the ratio of the impedance of said capacity at wave lengths within said range to the magnitude of said series impedance being great, whereby the tendency of the amplifying system to instability is compensated for by said series impedance whose stabilizing effect rapidly increases with decrease of wave length.

3. The combination with a thermionic amplifier, of an input system therefor tunable throughout a wave length range by fixed inductance and a variable condenser in shunt therewith forming a tunable loop, an output system tunable throughout said wave length range by fixed inductance with a variable condenser effectively in shunt therewith, the tendency of the amplifying system to become unstable increasing throughout said wave length range as said input and output systems are tuned to shorter and shorter wave lengths of said range, and fixed resistance all of which is disposed in series between one terminal of said tunable loop and the grid of said amplifier, whereby the tendency of the amplifying system to instability is compensated for by said resistance whose stabilizing effect rapidly increases with decrease of wave length, the other terminal of said tunable loop of said input system being substantially at the potential of the cathode of said amplifier.

4. In a thermionic amplifier, the combination of a vacuum tube having input electrodes and output electrodes, an input system comprising an inductance element and a fixed resistance connected in series with said inductance element between said input electrodes, said input system being tunable by means of a loop circuit comprising fixed inductance and a variable condenser, said fixed resistance being connected externally to said loop circuit, an output system for said vacuum tube, said input and output systems being both tunable throughout a wave-length range, said output system being characterized in that it causes said amplifier to have a tendency to become increasingly unstable as said input and output systems are tuned to shorter and shorter wave lengths, said fixed resistance being operable to exercise a stabilization effect on said amplifier increasingly as the operating wavelength decreases.

5. A radio frequency amplifier system comprising a thermionic tube having a cathode, a grid and plate, said cathode and grid having inherent capacity existing therebetween, a tunable input circuit for said tube including fixed inductance shunted by a variable condenser for tuning said input circuit throughout a wave length range, a fixed inductance in the output system of said tube, a variable condenser in shunt therewith for tuning said output system throughout said wave length range, the tendency of the amplifying system to become unstable increasing throughout said wave length range as said input circuit and output system are tuned to shorter and shorter wave lengths of said range, and a resistance in series in the grid circuit of said tube and external to the loop formed by the inductance and tuning condenser in said input circuit, said resistance having a magnitude which is fixed for all intensities of received signals, whereby the tendency of the amplifying system to instability is compensated for by said resistance whose stabilizing effect rapidly increases with decrease of wave length.

6. A radio-frequency amplifier system comprising a thermionic tube having a cathode, a grid and plate, said grid and cathode having inherent capacity existing therebetween, a tunable input circuit for said tube including the secondary of a coupling transformer shunted by a variable condenser for tuning said input circuit throughout a wave length range, a transformer in the output system of said tube, a variable condenser in circuit with one of the windings of said last-named transformer for tuning said output system throughout said wave length range, the tendency of the amplifier to become unstable increasing throughout said wave length range as said input circuit and output system are tuned to shorter and shorter wave lengths of said range, and a resistance in series in the grid circuit of said tube and external to the loop formed by the secondary of said first-named transformer and said tuning condenser in said input circuit, the inductance of the primary and secondary circuits of said transformers being fixed in magnitude for all wave lengths of said range, said resistance having a magnitude which is fixed for all wave lengths of said range, whereby the tendency of the amplifying system to instability is compensated for by said resistance whose stabilizing effect rapidly increases with decrease of wave length.

HARRY W. HOUCK.